United States Patent Office 3,707,491
Patented Dec. 26, 1972

3,707,491
INSECTICIDE WITH JUVENILE HORMONE ACTIVITY AND A PROCESS OF ITS PREPARATION
Miroslav Romanuk, Frantisek Sorm, and Karel Slama, Prague, Czechoslovakia, assignors to Ceskoslovenska Akademie Ved, Prague, Czechoslovakia
No Drawing. Filed Mar. 19, 1970, Ser. No. 21,219
Claims priority, application Czechoslovakia, Apr. 9, 1969, 2,503/69
Int. Cl. A01n 9/24; C07c 57/02, 69/52
U.S. Cl. 260—410.9 R                    13 Claims

ABSTRACT OF THE DISCLOSURE

Hydrocarbon carboxylic acids and esters thereof having a terminal tertiary butyl group useful for control of insects.

---

This invention relates to novel compounds with juvenile hormone activity for the control of insects and a process of its preparation.

The juvenile hormone activity has been discovered in substances occurring in some plants, especially in the case of farnesol and todomatsuic acid methyl ester (the so-called juvabione). A similar activity has been found in lipidic insect extracts (probably due to the presence of fatty acids) and in the so-called cecropia oil obtained from the butterfly Hyalophora cecropia. As discovered later, this oil contained as the principal component the so-called cecropia juvenile hormone.

A number of synthetic compounds with juvenile hormone activity have been recently prepared, most of them being closely related to farnesoic acid. Particularly suitable are compounds containing a minimum of heteroatoms, especially halo atoms, in their molecule because of the lowered toxicity towards warm-blooded animals. The last mentioned requirements are suitably fulfilled by the present invention.

The present invention also relates to novel compositions with juvenile hormone activity, which compositions contain as active substance novel analogues of farnesoic acid of the Formula I:

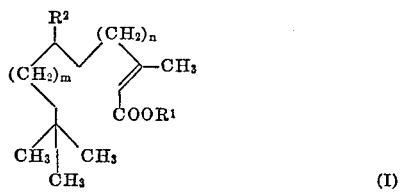

wherein, $R^1$ designates hydrogen, lower alkyl, cycloalkyl or aralkyl; $R^2$ represents an alkyl group containing one to four carbon atoms, $m$ is one or two; and $n$ is one or two. Hereinafter, each of $R^1$, $R^2$, $m$ and $n$ is as defined heretofore, unless otherwise specified.

The term "lower alkyl," as used herein, refers to a straight or branched chain saturated aliphatic hydrocarbon group having a chain length of one to six carbon atoms, such as methyl, ethyl, propyl, i-propyl, t-butyl, pentyl and n-hexyl. The term "cycloalkyl," as used herein, refers to a cycloalkyl group having four to eight carbon atoms, such as cyclobutyl, cyclopentyl and cyclohexyl. The term "aralkyl," as used herein, refers to an aralkyl group having seven to twelve carbon atoms, such as benzyl, phenylethyl and naphthylmethyl.

The present invention relates also to a process of preparing the novel compounds of Formula I which comprises the Kolbe anodic synthesis between an acid of the Formula II:

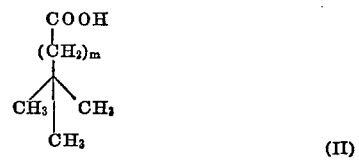

and α,β-alkylglutaric acid half-ester of the Formula III:

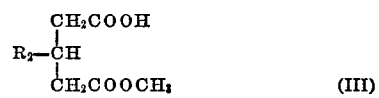

thus forming an ester of the Formula IV:

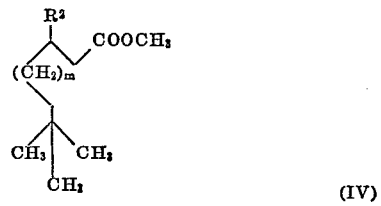

saponifying the latter, thus forming an acid of the Formula V:

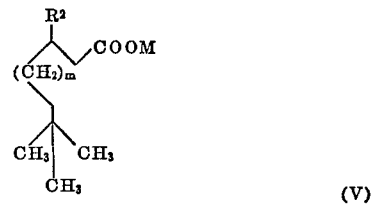

subjecting the latter acid to the Kolbe anodic synthesis either with 5-alkoxycarbonyl-4-methyl-4-pentenoic acid of the Formula VI:

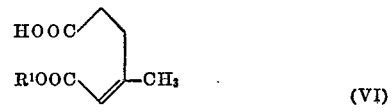

or with the half-ester of β-hydroxy-β-methylglutaric acid, and dehydrating the product to yield the compounds of Formula I.

The present invention relates also to the Kolbe anodic synthesis with the use of the acid of the Formula V and 3-methyl-3-hydroxy-5-hexenoic acid to yield the vinyl hydroxy compounds of the Formula VII:

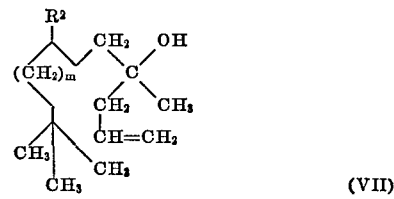

and the subsequent vinyl hydroxy compounds.

The novel analogues of the Formula I are prepared according to the invention by connecting three components with the use of the Kolbe anodic synthesis, namely, Component A: represented by tert-butylacetic acid (3,3-dimethylbutyric acid) or tert-butylpropionic acid (4,4-dimethylvaleric acid);

Component B: represented by β-alkylglutaric acid half-ester, the alkyl group of which consists of one to four carbon atoms;

Component C: represented by 5 - alkoxycarbonyl - 4-methyl-4-pentenoic acid of the Formula VI, or by β-hydroxy-β-methylglutaric acid half-ester, or 3-methyl-3-hydroxy-5-hexenoic acid.

The above-mentioned sequence of reactions is preferably started with the use of the Kolbe anodic synthesis to connect Component A with the Component B under the formation of a monocarboxylic acid ester of the Formula IV.

In the case of β-hydroxy-β-methylglutaric acid half-ester as Component C, the resulting hydroxy ester is readily dehydrated to the required farnesoic acid ester.

In the case of 3-methyl-3-hydroxy-5-hexenoic acid as Component C, the resulting intermediary vinyl hydroxy compound of the Formula VII is then subjected to ozonization, dehydration and esterification.

In accordance with the present invention, there is provided a method for the control of insects which comprises contacting the insects with a compound selected from those of Formula I above in an amount effective to inhibit the metamorphosis of said insects. To aid in achieving a uniform distribution or application, it is advantageous to employ a composition comprising an inert carrier and, as the essential active ingredient, a compound of Formula I. One method for the control of insects in accordance with the present invention is to apply the composition comprising an inert carrier and a compound of Formula I to the locus of insect infestation, such as to the plant life on which the insects live. These compositions can be either solid or liquid. Solid compositions for treating insects can be prepared by incorporating the active compound with an inert carrier, such as finely divided talc, silica, pyrophyllite or clay or granular inert carriers, such as the vermiculites. Liquid compositions can be prepared by mixing the active compound with inert carriers, such as acetone, xylene, peanut oil, cottonseed oil, sesame oil and other vegetable oils and mineral oils conventionally employed as carriers in insecticidal formulations for application by spraying. Emulsions containing the active ingredient can also be used. Other ingredients can be present in the compositions of the present invention to aid in the effective application of the active ingredient, such as wetting agents, dispersing agents, insect attractants, and the like. The concentration of active ingredient of a compound of Formula I in the composition can vary greatly and will depend on a variety of factors, such as the specific insect involved, degree of insect infestation, locus of insect infestation, environmental and weather conditions and type of application device used. Generally, the composition will contain less than 95% by weight of the active ingredient and more frequently less than 10% by weight. The compounds of Formula I are useful insect control agents by virtue of their ability to inhibit the metamorphosis of the insect. The expression "to inhibit the metamorphosis of said insect," as used herein, and in the appended claims, is used to describe the direct insecticidal effect of the compounds of Formula I as well as the indirect insecticidal effect of said compounds. In some cases the compounds have a direct insecticidal effect in that the insect dies upon contact with a compound of Formula I, particularly when the compound is applied at the egg stage and larvae stage of the insect's life. In other cases, the compounds of the present invention have an indirect insecticidal effect in that upon contact with a compound of Formula I the egg stage, larvae stage or pupa stage, the insect is unable to pass from one metamorphic stage to the next in a normal manner and eventually dies without reproducing.

The present invention will be further illustrated by the following examples although it is not limited thereto.

EXAMPLE 1

Preparation of methyl cis,trans 3,7,10,10-tetramethyl-2-undecenoate (a) Preparation of methyl 3,6,6-trimethylheptanoate.—Monomethyl β-methylglutarate (3.50 g.) and tert-butylacetic acid (4.00 g.) are dissolved in methanol (10 ml.) containing sodium methoxide (60 mg.). The resulting solution is subjected to electrolysis according to Kolbe. Reaction conditions: reaction period, 8 hours; direct current, 6 volt, 0.35–0.30 amperes; reaction temperature, 30–35° C.; platinum electrodes, distance 2 millimeters; the initial pH value, 6–7, the final pH value, 9–10. The electrolysis is instantly interrupted as soon as the mixture shows an alkaline reaction. The reaction mixture is then evaporated under diminished pressure and the residue is extracted with two 50 ml. portions of petroleum ether. The extract is concentrated and the concentrate is chromatographed on a column of a 50-fold amount (by weight) of silica gel. The elution is performed with the use of a 10:1 petroleum ether—ether solvent mixture. Distillation of the principal chromatographic fraction affords 1.75 g. of methyl 3,6,6-trimethylheptanoate, a clear colorless liquid, B.P. 70–73° C./12 mm. Hg. Infrared spectrum: the main maximum at 1725 cm.$^{-1}$.

(b) Preparation of 3,6,6-trimethylheptanoic acid.—The methyl ester of the preceding paragraph (1.70 g.) is refluxed for three hours in a solution of potassium hydroxide (5.0 g.) in 25% aqueous methanol (20 ml.). The reaction mixture is evaporated under diminished pressure, the residue diluted with water (20 ml.) and washed with ether (20 ml.) to remove the neutral portions. The aqueous phase is acidified with 10% aqueous sulfuric acid to the pH value 3–4 and extracted with three 20 ml. portions of ether. The ethereal extracts are combined, washed with water (10 ml.), dried over anhydrous sodium sulfate and evaporated. Distillation of the residue affords 1.45 g. of 3,6,6-trimethylheptanoic acid, B.P. 110–113° C./0.5 mm. Hg. Infrared spectrum: main maxima at 1412, 1709 and 2400–3400 cm.$^{-1}$. For $C_{10}H_{20}O_2$ (172.3) calculated: 69.72% C, 11.70% H; Found: 69.36% C, 11.53% H.

(c) Preparation of methyl cis,trans - 3,7,10,10 - tetramethyl-2-undecenoate.—The Kolbé anodic synthesis is performed in analogy to paragraph (b) Reactants: 3,6,6-trimethylheptanoic acid (1.45 g.), 5-methoxycarbonyl-4-methyl-4-pentenoic acid (2.10 g.), sodium (40 mg.) and methanol (10 ml.). Conditions: six hours at 35–40° C., 6 volt, 0.20–0.30 ampere. The isolation and purification is performed on a column of silica gel also in analogy to paragraph (b). Distillation of the chromatographic ester fraction affords 520 mg. of methyl 3,7,10,10-tetramethyl-2-undecenoate, a clear colorless liquid, B.P. 100–102° C./0.5 mm. Hg. Infrared spectrum: main maxima at 1152, 1650 and 1721 cm.$^{-1}$. For $C_{16}H_{30}O_2$ (254.4) calculated: 75.53% C, 11.89% H; Found: 75.57% C, 11.83% H.

EXAMPLE 2

Preparation of ethyl cis,trans-3,7,10,10-tetramethyl-2-undecenoate (a) 3,6,6-trimethylheptanoic acid is prepared in the same manner as given in Example 1(b).

(b) The Kolbe anodic synthesis, the isolation and the purification of the product is performed in analogy to Example 1(c). Reactants: 3,6,6-trimethylheptanoic acid (1.50 g.), 5-ethoxycarbonyl-4-methyl-4-pentenoic acid (2.35 g.), sodium (50 mg.) and methanol (10 ml.). Distillation of the appropriate chromatographic (silica gel) fraction affords 610 mg. of the title ethyl ester, a clear colorless liquid, B.P. 117–119° C./0.5 mm. Hg. Infrared

EXAMPLE 3

Preparation of methyl cis,trans-3,10,10-trimethyl-7-ethyl-2-undecenoate (a) Preparation of 6,6 - dimethyl - 3 - ethylheptanoic acid.—The title acid is prepared by the Kolbe anodic synthesis in analogy to Examples 1(a) and (b) and 2(a). Reactants: β-ethylglutaric acid monomethyl ester (3.15 g.), tert-butylacetic acid (3.95 g.), sodium (35 mg.) and methanol (10 ml.). The isolation procedure is also analogous to that used in Examples 1 and 2. Yield, 1.66 g. of 6,6-dimethyl-3-ethylheptanoic acid, a clear colorless liquid, B.P. 122–125° C./0.5 mm. Hg. Infrared spectrum: main maxima at 1415, 1710 and 2400–3400 cm.$^{-1}$. For $C_{11}H_{22}O_2$ (186.3) calculated: 70.92% C, 11.90% H; Found: 71.02% C, 11.74% H.

(b) Preparation of methyl cis,trans-3,10,10-trimethyl-7-ethyl-2-undecenoate,.—The Kolbe anodic synthesis and the isolation procedure are performed in analogy to Example 1(c). Reactants: 6,6-dimethyl-3-ethylheptanoic acid (1.50 g.), 5-methoxycarbonyl-4-methyl-4-pentenoic acid (2.00 g.), sodium (50 mg.) and methanol (10 ml.). Chromatography and the subsequent distillation affords 340 mg. of methyl 3,10,10-trimethyl-7-ethyl-2-undecenoate as a clear colorless liquid, B.P. 112–113° C./0.5 mm. Hg. Infrared spectrum: main maxima at 1150, 1650 and 1725 cm.$^{-1}$. For $C_{17}H_{32}O_2$ (268.4) calculated: 76.06% C, 12.02% H; Found: 75.89% C, 12.21% H.

The juvenile hormone activity was tested topically on freshly moulted larvae of the last instar of the following Hemiptera: *Pyrrhocoris apertus, Dysdercus cingulatus* and *Graphosoma italicum*. In the case of the beetle *Tenebrio molitor*, the substance was injected into freshly moulted pupae. The hormonal activity was evaluated according to the degree of preservation of the larval (Hemiptera) or pupal (*Tenebrio molitor*) epidermal structures. Zero indicates the formation of perfect adults from larvae or pupae; activity 5 desginates formation of abnormal extra larvae or secondary pupae instead of an adult. Activities 1–4 represent intermediary adultoid forms between larvae (pupae) and the adult insect according to the amount of the substance used. The results are shown in the following table:

TABLE I

Juvenile Hormone Activity for Methyl 3,7,10,10-Tetramethyl-2-Undecanoate

| Insect | Dose in micrograms per specimen | | | | |
|---|---|---|---|---|---|
|  | 0.01 | 0.1 | 1.0 | 10 | 100 |
| Pyrrhocoris apertus | 0 | 1 | 4 | 5 | 5 |
| Dysdercus cingulatus | 0 | 0 | 2 | 5 | 5 |
| Graphosoma italicum | 0 | 0 | 0 | 3 | 5 |
| Tenebrio molitor | 1 | 2 | 3 | 4 | 5 |

EXAMPLE 4

Each of 3,7,10,10-tetramethylundec-2-enoic acid and 3,10,10 - trimethyl - 7 - ethylundec-2-enoic acid is obtained from the corresponding methyl ester using the procedure of Example 1(b).

EXAMPLE 5

A mixture of methyl 3,7,10,10-tetramethylundec-2-enoate (2.5 g.), benzyl alcohol (2.2 g.), aluminum ethoxide (0.1 g.) and p-phenylenediamine (0.2 g.) is heated in an atmosphere of nitrogen at 120° C. for ten hours. Methanol set free by the reaction is removed by distillation. The residual reaction mixture is diluted with ether and then washed with 3% aqueous sulfuric acid and then water until neutral. The solvents are evaporated and the residue distilled in vacuo to yield benzyl 3,7,10,10-tetramethylundec-2-enoate.

Other esters of Formula I can be prepared using this procedure by substituting the appropriate alcohol in place of benzyl alcohol, e.g. cyclopentyl alcohol, cyclohexyl alcohol, and the like.

EXAMPLE 6

Preparation of methyl cis,trans-3,6,9,9-tetramethyl-2-decenoate (Formula I, $m=n=1$, $R^1=R^2=$methyl)

(a) preparation of 2,2,5,8-tetramethyl-8-hydroxy-10-undecene.— 3,6,6-trimethylheptanoic acid (3.5 g.); Formula V, $m=1$, $R^2=$methyl) and 3-methyl-3-hydroxy-5-hexenoic acid (3.5 g.) are dissolved in methanol (10 ml.) containing sodium methoxide (60 mg.). The resulting solution is subjected to the Kolbe anodic synthesis (reaction period, ten hours); 0.3–0.6 ampere at 24 volt; reaction temperature 35–45° C.; platinum electrodes, distance 2 millimeter; initial pH value 6–7, the final pH value 9–10. The electrolysis is interrupted as soon as the reaction mixture begins to show the alkaline reaction. The methanol is then evaporated under reduced pressure and the residue is chromatographed on a column of silica gel (100 parts by weight of silica gel per one part of the residue). Elution is effected with light petroleum-ether (7:1). The eluate is evaporated and the residue distilled to afford 0.95 g. of Compound VII ($m=1$, $R^2=$methyl), B.P. 105–108° C./ 0.6 torr. For $C_{15}H_{30}O$ (220.4) calculated: 79.57% C, 13.36% H; Found:79.76% C, 13.49% H. Infrared spectrum: main maxima at 918, 1000, 1634, 3005 and 3070 cm.$^{-1}$ (vinyl); 3610 cm.$^{-1}$ (hydroxyl); 1367, 1393 cm.$^{-1}$ (tert-butyl).

(b) Preparation of methyl 3-hydroxy-3,6,9,9-tetramethyldecanoate.—A mixture of ozone and oxygen (containing about 3% of $O_3$) introduced slowly into a solution of the vinyl hydroxy compound of Part (a) in ethyl acetate. The reaction is interrupted as soon as the mixture begins to assume a blue color (after about 20 minutes in this run). Water (15 ml.), acetic acid (15 ml.) and hydrogen peroxide (3 ml.) are then added, the whole mixture refluxed for one hour, cooled to 20° C., diluted with additional water (20 ml.) and extracted with five 15 ml. portions of ether. The ethereal extracts are combined, dried and evaporated under diminished pressure. The crude residue is esterified by the addition of ethereal diazomethane, the ether is evaporated and the residue is distilled under diminished pressure to afford 310 mg. (purity, 80%) of the hydroxy ester (methyl 3-hydroxy-3,6,9,9-tetramethyldecanoate), B.P. 105° C./0.1 torr. Infrared spectrum: 1725 cm.$^{-1}$ (ester), 3400 cm.$^{-1}$ (hydroxyl).

(c) Preparation of methyl cis,trans-3,6,9,9-tetramethyl-2-decenoate.—A mixture of the hydroxy ester of Part (b) (180 mg.) and 98% formic acid (2.0 g.) is heated at 85–90° C. for two hours, allowed to stand at 20–25° C. for 15 hours and evaporated under diminished pressure. The residue is esterified by the addition of ethereal diazomethane, the ether is evaporated and the resulting residue is purified by column chromatography on silica gel (100 parts by weight of silica gel per one part of the residue). The elution is performed with light petroleum-ether (4:1). The eluate is evaporated and the residue distilled under reduced pressure to afford 46 mg. of methyl 3,6,9,9-tetramethyl-2-decenoate, B.P. 125–127° C./1 torr. For $C_{15}H_{28}O_2$ (240.4) calculated: 74.95% C, 11.74% H. Found: 74.52% C, 11.76% H. Infrared spectrum: 1720, 1645 cm.$^{-1}$ (unsaturated ester).

EXAMPLE 7

Preparation of ethyl cis,trans-3,6,9,9-tetramethyl-2-decenoate (Formula I, $m=n=1$, $R^1=$ethyl, $R^2=$methyl)

(a) Preparation of 2,2,5,8-tetramethyl-8-hydroxy-10-undecene. (The vinyl hydroxy Compound VII, $m=1$, $R^2$=methyl.)—The title compound is prepared according to Example 1, Part (a).

(b) Preparation of ethyl 3-hydroxy-3,6,9,9-tetramethyldecanoate (IX).—The title preparation is performed according to Example 1, Part (b) except for the esterification of the crude residue which is effected with the use of ethereal diazoethane instead of ethereal diazomethane. Yield, 280 mg. of the hydroxy ester (IX), B.P. 116° C./0.1 torr (purity, about 80%). Infrared spectrum: 1725 and 3420 cm.$^{-1}$.

(c) Preparation of ethyl cis,trans 3,6,9,9-tetramethyl-2-decenoate.—The title preparation is performed according to Example 1, Part (c) except for the esterification of the crude residue which is effected with the use of ethereal excess diazoethane instead of ethereal diazomethane. Yield, 52 mg. of ethyl 3,6,9,9-tetramethyl-2-decenoate, B.P. 137° C./1 torr. Infrared spectrum: 1720 and 1640 cm.$^{-1}$.

TABLE II

Juvenile Hormone Activity Units of Methyl 3,6,9,9-Tetramethyl-2-Decanoate

| Insect | Dose in μg. per specimen | | | |
|---|---|---|---|---|
| | 0.1 | 1.0 | 10 | 100 |
| Pyrrhocoris apterus | 0 | 0 | 0 | 2 |
| Graphosoma italicum | 0 | 0 | 0 | 3 |
| Lygaeus equestris | 0 | 0 | 0 | 3 |

What is claimed is:

1. A compound selected from those of Formula I:

$$\text{(I)}$$

wherein, $R^1$ is hydrogen, lower alkyl, cycloalkyl or aralkyl; $R^2$ is alkyl of one to four carbon atoms; $m$ is one or two; and $n$ is one or two.

2. A compound according to claim 1 wherein $n$ is two.
3. A compound according to claim 1 wherein each of $n$ and $m$ is two.
4. A compound according to claim 1 wherein $R^1$ is lower alkyl.
5. A compound according to claim 1 wherein $R^1$ is lower alkyl; $R^2$ is methyl or ethyl; and $n$ is two.
6. A compound according to claim 5 wherein $R^1$ is methyl or ethyl.
7. A compound according to claim 3 wherein $R^1$ is methyl or ethyl.
8. A compound according to claim 7 wherein $R^2$ is methyl.
9. A compound according to claim 1 wherein $m$ is one; $n$ is two; $R^2$ is methyl; and $R^1$ is hydrogen, methyl or ethyl.
10. A compound according to claim 1 wherein $m$ is one; $n$ is one; $R^2$ is methyl; and $R^1$ is hydrogen, methyl or ethyl.
11. A compound according to claim 1 wherein $m$ is two; $n$ is one; $R^2$ is methyl; and $R^1$ is hydrogen, methyl or ethyl.
12. A compound selected from those of Formula V:

$$\text{(V)}$$

wherein, $m$ is one or two and $R^2$ is alkyl of one to four carbon atoms and the methyl ester thereof.

13. A compound according to claim 12 wherein $R^2$ is methyl or ethyl.

References Cited

UNITED STATES PATENTS

| 3,429,970 | 2/1969 | Rüegg et al. | 424—333 |
| 2,470,859 | 5/1949 | Pavlic | 260—540 |

OTHER REFERENCES

Chemical Abstracts 52, 11783b (1958).
Chemical Abstracts 55, 384c–385c (1961).
Chemical Abstracts, 3961b (1963).
Burrell et al.: J. Chem. Soc. ©, No. 23, pp. 2144–54 (1966).
Fuson: "Reactions of Organic Compounds" John Wiley & Sons Inc., New York (1962), pp. 226–7 relied upon.

LEWIS GOTTS, Primary Examiner
D. G. RIVERS, Assistant Examiner

U.S. Cl. X.R.

260—410, 410.5, 413, 488 F, 540 R, 632 R; 424—312, 318